(12) United States Patent
Avaltroni et al.

(10) Patent No.: US 7,691,478 B2
(45) Date of Patent: Apr. 6, 2010

(54) THIN FILMS

(75) Inventors: Michael Avaltroni, Staten Island, NY (US); Eric L. Bruner, San Diego, CA (US); Eric L. Hanson, San Diego, CA (US)

(73) Assignee: Aculon, Inc., San Diego, CA (US)

( * ) Notice: Subject to any disclaimer, the term of this patent is extended or adjusted under 35 U.S.C. 154(b) by 510 days.

(21) Appl. No.: 11/339,860

(22) Filed: Jan. 25, 2006

(65) Prior Publication Data

US 2006/0166000 A1 Jul. 27, 2006

Related U.S. Application Data

(60) Provisional application No. 60/648,013, filed on Jan. 27, 2005.

(51) Int. Cl.
*B32B 27/36* (2006.01)
*B32B 9/04* (2006.01)

(52) U.S. Cl. .............. 428/412; 106/31; 106/48; 347/85; 347/86; 347/100; 427/402; 427/421.1; 428/411.1; 428/432; 528/196; 528/198

(58) Field of Classification Search .......... 106/31.48, 106/31, 48; 347/85, 86, 100; 428/411, 412, 428/411.1; 528/196, 198; 427/402, 421.1
See application file for complete search history.

(56) References Cited

U.S. PATENT DOCUMENTS

| 3,556,882 | A | 1/1971 | Fishman et al. .............. 156/2 |
| 3,658,573 | A | 4/1972 | Guestaux et al. ........... 117/76 P |
| 6,020,047 | A | 2/2000 | Everhart ..................... 428/209 |
| 6,146,767 | A | 11/2000 | Schwartz ..................... 428/457 |
| 6,433,359 | B1 | 8/2002 | Kelley et al. .................. 257/40 |
| 6,645,644 | B1 | 11/2003 | Schwartz et al. ............ 428/632 |
| 7,105,227 | B2 * | 9/2006 | Yasuda et al. .............. 428/365 |
| 2003/0186914 | A1 | 10/2003 | Hofer et al. ................... 514/44 |
| 2004/0001959 | A1 | 1/2004 | Schwartz et al. ............ 428/469 |
| 2004/0023048 | A1 | 2/2004 | Schwartz et al. ......... 428/472.1 |
| 2004/0210056 | A1 * | 10/2004 | Wood et al. ................. 546/216 |
| 2004/0265571 | A1 | 12/2004 | Schwartz et al. ............ 428/333 |
| 2005/0031910 | A1 | 2/2005 | Schwartz et al. ............ 428/702 |

FOREIGN PATENT DOCUMENTS

| GB | 787356 | 12/1957 |
| GB | 1162384 | 8/1969 |

* cited by examiner

*Primary Examiner*—Terressa M Boykin
(74) *Attorney, Agent, or Firm*—William J. Uhl

(57) ABSTRACT

Structures comprising substrates comprised of an organic material capable of accepting a proton from an organophosphorous compound and a film of the organophosphorous compound bonded to the substrate are disclosed. The structures are useful in a variety of applications such as visual display devices.

26 Claims, 2 Drawing Sheets

THIN FILMS

CROSS REFERENCE TO RELATED APPLICATION

The present application claims priority from U.S. Provisional Patent Application Ser. No. 60/648,013, filed Jan. 27, 2005.

TECHNICAL FIELD

The invention relates to thin films, methods of making the films, and structures including the films.

BACKGROUND

A variety of structures can have their native surfaces modified to provide desired effect. For example, visual displays, such as computer monitors and touchscreens, may be treated with an antireflective layer of oxide to reduce glare and reflection. Medical devices, such as orthopedic implants, may be coated with an osteoconductive layer that promotes bone growth to the implant and integration of the implant into the body. Certain devices can be passivated or be made more hydrophilic or hydrophobic, to protect the devices from ill effects (such as corrosion, wear, or water permeation) caused by the environment in which the devices are used. Surface modifications of substrates are described, for example, in U.S. Pat. No. 6,146,767; U.S. Pat. No. 6,645,644; US 2004/0001959; US 2004/0023048; and PCT/US/2003/034909, all hereby incorporated by reference.

SUMMARY

The invention relates to structures comprising an organic substrate, preferably, a substrate capable of accepting a proton from an organophosphorous compound and a film of the organophosphorous compound bonded to the substrate, the film being characterized such that the organic groups associated with the organophosphorous compound are exposed to the atmosphere and preferably are oriented away from the substrate.

Embodiments may include one or more of the following features. The organophosphorous compound is an organophosphorous acid or derivative thereof such as an organophosphonic acid. The substrate includes oxygen. The substrate includes a hydroxyl group, an oxo group, and/or a carboxyl group. The substrate includes a nitrogen-hydrogen bond. The substrate is a polymer such as a polycarbonate, an epoxy resin or a resin derived from an epoxy resin. The substrate may be flexible, such as a film or rigid such as a structural plastic. The organophosphorous acid or derivative thereof includes an aliphatic group or an olefinic group. The acid includes an aryl-substitute group. The film can be a monolayer or a multilayer structure. The film may have a contact angle equal to or greater than about 75°.

In another aspect, the invention features a structure in which the organophosphorous compound is chemically bonded to the substrate by phosphorus-oxygen bonds.

Other aspects, features and advantages will be apparent from the description of the embodiments and from the claims.

DETAILED DESCRIPTION

Figure 1A:
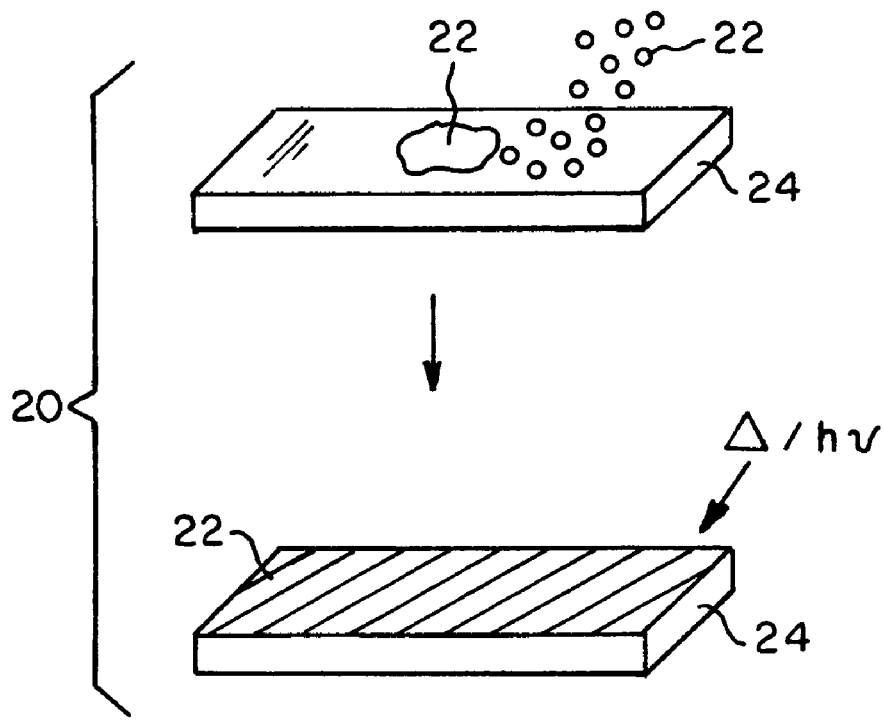
FIG. 1A illustrates a method of making a thin film.
Figure 1B:
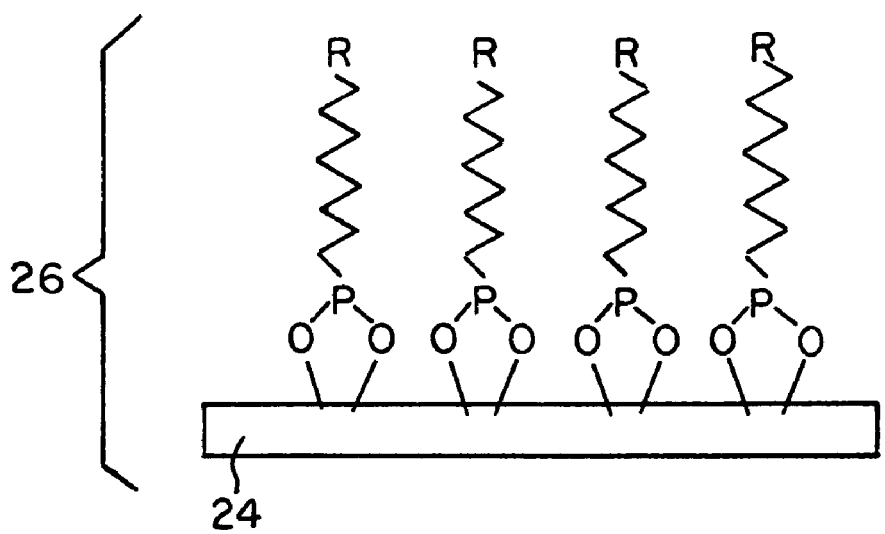
FIG. 1B is a detailed view of a substrate having a thin film.

Referring to FIGS. 1A and 1B, a method 20 of making a thin film is shown. As shown, method 20 includes applying a solution 22 containing an organophosphorous compound to a surface of a substrate 24 to form a layer of the solution. The organophosphorous compound (such as an aliphatic phosphonic acid) includes an organic component (such as an aliphatic chain) and an acidic functional group (such as phosphonic acid). Subsequently, the layer of solution 22 is treated (e.g., cured) by exposing the solution to heat and/or electromagnetic radiation to form an adherent thin film 26 (for example, a monolayer) on substrate 24 (FIG. 1B). Thin film 26 includes a plurality of organic components from the organic acid chemically bonded directly to substrate 24, for example, via a phosphorus-oxygen bond.

The thin film can be used to modify the surface properties of substrate 24. For example, solution 22 can include a material (such as an aliphatic phosphonic acid) adapted to bond with substrate 24. In this example, when the acid group of the material bonds with the substrate, the aliphatic group preferably extends away from the surface of the substrate, thereby enhancing the hydrophobicity the surface. The enhanced hydrophobicity can increase the substrate's resistance to water, fogging, and smudging. The modified substrate can also have altered interactions with other materials or interfaces. For example, the organic components can make the surface of the substrate more non-stick and/or more lubricious, which can be beneficial for certain applications. Certain organic components can also enhance the non-fouling characteristics of a surface so that cells (e.g., from bacteria, scar tissue, mildew, mold, and other unwanted organisms) do not adhere well to the treated surface.

Examples of organophosphorous acid or derivative thereof are organophosphoric acids, organophosphonic acids and/or organophosphinic acids including derivatives thereof. Examples of derivatives are materials that perform similarly as the acid precursors such as acid salts, acid esters and acid complexes. The organo group of the phosphorous acid may be a monomeric, oligomeric or polymeric group. Examples of monomeric phosphorous acids are phosphoric acids, phosphonic acids and phosphinic acids including derivatives thereof.

Examples of monomeric phosphoric acids are compounds or a mixture of compounds having the following structure:

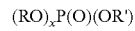

wherein x is 1-2, y is 1-2 and x+y=3, R is a radical having a total of 1-30, preferably 6-18 carbons, where R' is H, a metal such as an alkali metal, for example, sodium or potassium or lower alkyl having 1 to 4 carbons, such as methyl or ethyl. Preferably, a portion of R' is H. The organic component of the phosphoric acid (R) can be aliphatic (e.g., alkyl having 2-20, preferably 6-18 carbon atoms) including an unsaturated carbon chain (e.g., an olefin), or can be aryl or aryl-substituted moiety.

Example of monomeric phosphonic acids are compounds or mixture of compounds having the formula:

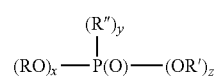

wherein x is 0-1, y is 1, z is 1-2 and x+y+z is 3. R and R" are each independently a radical having a total of 1-30, preferably 6-18 carbons. R' is H, a metal, such as an alkali metal, for example, sodium or potassium or lower alkyl having 1-4 carbons such as methyl or ethyl. Preferably at least a portion of R' is H. The organic component of the phosphonic acid (R and R") can be aliphatic (e.g., alkyl having 2-20, preferably 6-18 carbon atoms) including an unsaturated carbon chain (e.g., an olefin), or can be an aryl or aryl-substituted moiety.

Example of monomeric phosphinic acids are compounds or mixture of compounds having the formula:

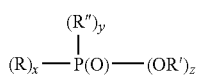

wherein x is 0-2, y is 0-2, z is 1 and x+y+z is 3. R and R" are each independently radicals having a total of 1-30, preferably 6-18 carbons. R' is H, a metal, such as an alkali metal, for example, sodium or potassium or lower alkyl having 1-4 carbons, such as methyl or ethyl. Preferably a portion of R' is H. The organic component of the phosphinic acid (R, R") can be aliphatic (e.g., alkyl having 2-20, preferably 6-18 carbon atoms) including an unsaturated carbon chain (e.g., an olefin), or can be an aryl or aryl-substituted moiety.

Examples of organo groups which may comprise R and R" include long and short chain aliphatic hydrocarbons, aromatic hydrocarbons and substituted aliphatic hydrocarbons and substituted aromatic hydrocarbons. Examples of substituents include carboxyl such as carboxylic acid, hydroxyl, amino, imino, amido, thio, cyano, fluoro such as $CF_3(C_nF_{2n})CH_2CH_2PO_3H_2$ where n=3-15, $CF_3(CF_2)_nO(CF_2CF_2)_y—CH_2CH_2—PO_3H_2$ where x is 0 to 7, y is 1 to 20 and x+y≦27, phosphonate, phosphinate, sulfonate, carbonate and mixed substituents.

Representative of the organophosphorous acids are as follows: amino trismethylene phosphonic acid, aminobenzylphosphonic acid, 3-amino propyl phosphonic acid, O-aminophenyl phosphonic acid, 4-methoxyphenyl phosphonic acid, aminophenylphosphonic acid, aminophosphonobutyric acid, aminopropylphosphonic acid, benzhydrylphosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphonic acid, naphthylmethylphosphonic acid, octadecylphosphonic acid, octylphosphonic acid, pentylphosphonic acid, phenylphosphinic acid, phenylphosphonic acid, bis-(perfluoroheptyl) phosphinic acid, perfluorohexyl phosphonic acid, styrene phosphonic acid, dodecyl bis-1,12-phosphonic acid.

In addition to the monomeric organophosphorous acids, oligomeric or polymeric organophosphorous acids resulting from self-condensation of the respective monomeric acids may be used.

Solution 22 can further include a suitable solvent for the organophosphorous compound, such as an alcohol (e.g., ethanol), tetrahydrofuran, dichloromethane, 2:1 by volume ethanol:toluene, and acetonitrile. The concentration of the organophosphorous compound can range from about 0.1 micromolar to as high as the upper limit of the solubility of the organophosphorous compound in a specific solvent, for example, from about 0.1 micromolar to about 100 micromolar, from about 0.1 micromolar to about 10.0 millimolar, for example, about 1.0 millimolar.

Substrate 24 is comprised of an organic material and may include a composite having an organic component and an inorganic component. The substrate 24, preferably, is capable of accepting protons from the organophosphorous compound such as an organophosphorous acid to chemically bond with the organic component of the organophosphorous compound. Substrate 24 can include one or more functional groups that are reactive (will form a chemical bond) with the organophosphorous compound applied to the substrate. In some embodiments, the surface of substrate 24 to be treated with the organophosphorous compound includes hydroxyl groups, oxo groups (for example, carboxylate groups, carboxylate anions, or μ-oxo groups), amide groups, and/or amine groups. In some embodiments, substrate 24 includes oxygen. Examples of organic substrates include polymers, such as epoxy resins, resins derived from epoxy resins, cured or uncured epoxies (such as UV curable epoxy resins, e.g., SU-8, or a mixture of organoepoxide and an organic amine), polyvinyl alcohol, nylon, and polycarbonates. An example of a composite substrate is wood coated with a polymer derived from an epoxy resin. The substrate can be flexible such as a free film or can be rigid such as a structural plastic.

Solution 22 can be applied to substrate 24 using one or more techniques, and allowing the solution to evaporate. For example, solution 22 can sprayed (e.g., a few microgram per square centimeter) onto, dropped on, and/or painted on substrate 24. Substrate 24 can be dipped into solution 22. Solution 22 can be applied using an elongated instrument capable of applying the solution across the surface of substrate 24 to form a uniform layer of the solution. Examples of elongated instruments include Mayer rods (which are rods with wires helically wrapped around the rods), wiping blades or blocks (e.g., Teflon blades or blocks), a doctor blade, a reverse roll, a die coater, a wire bar, a knife, and a blade coaters. Direct gravure, micro gravure and reverse gravure techniques can also be used. For Mayer rods, the size of the rods (or gauge of the wire on the rods) can be selected to control the amount of the solution that is applied on substrate 24. Mayer rod sizes of M0, #3, #5, or #10 can be used. In some embodiments, about 0.02 ml/cm² of solution is applied. Solution 22 can be applied to substrate 24 by drawing the elongated instrument across the surface of the substrate. Other methods of applying solution 22 to substrate 24 are described in US 2004/0023048 and PCT/US/2003/034909, both hereby incorporated by reference. Application of solution 22 may deposit one or multiple layers of the acid, and the amount of acid deposited can be determined by infrared analysis. In some embodiments, when multiple layers are deposited, rinsing the applied layers can decrease the layers to one monolayer.

After solution 22 is applied to substrate 24 and the solvent is allowed to evaporate, the applied layer on the substrate is treated to enhance bonding directly to the substrate. The applied layer can be treated with heat and/or electromagnetic radiation, such as microwave radiation (e.g., 2450 MHz or a wavelength of about 12 cm). In some embodiments, the applied layer is exposed to radiant and/or induction heating, for example, to a temperature of 50° C. to about 200° C. (e.g., about 150° C.) for about 30-120 seconds. The heating time may be a function of the temperature used, and the temperature used may be restricted by design considerations and/or materials limitations, such as the melting point of the substrate. Heat can also be applied by pressing a standard clothes iron (e.g., set at the highest setting) back and forth over the applied layer for 30-60 seconds, or by using a heat gun, convection oven, or a heat plate. Alternatively or additionally, the applied layer can be applied to microwave radiation (e.g., in a 700 Watt microwave oven) for about 30 seconds to about 120 seconds. After the heat treatment, the substrate and film can be rinsed with a solvent, such as ethanol and toluene.

Figure 2:
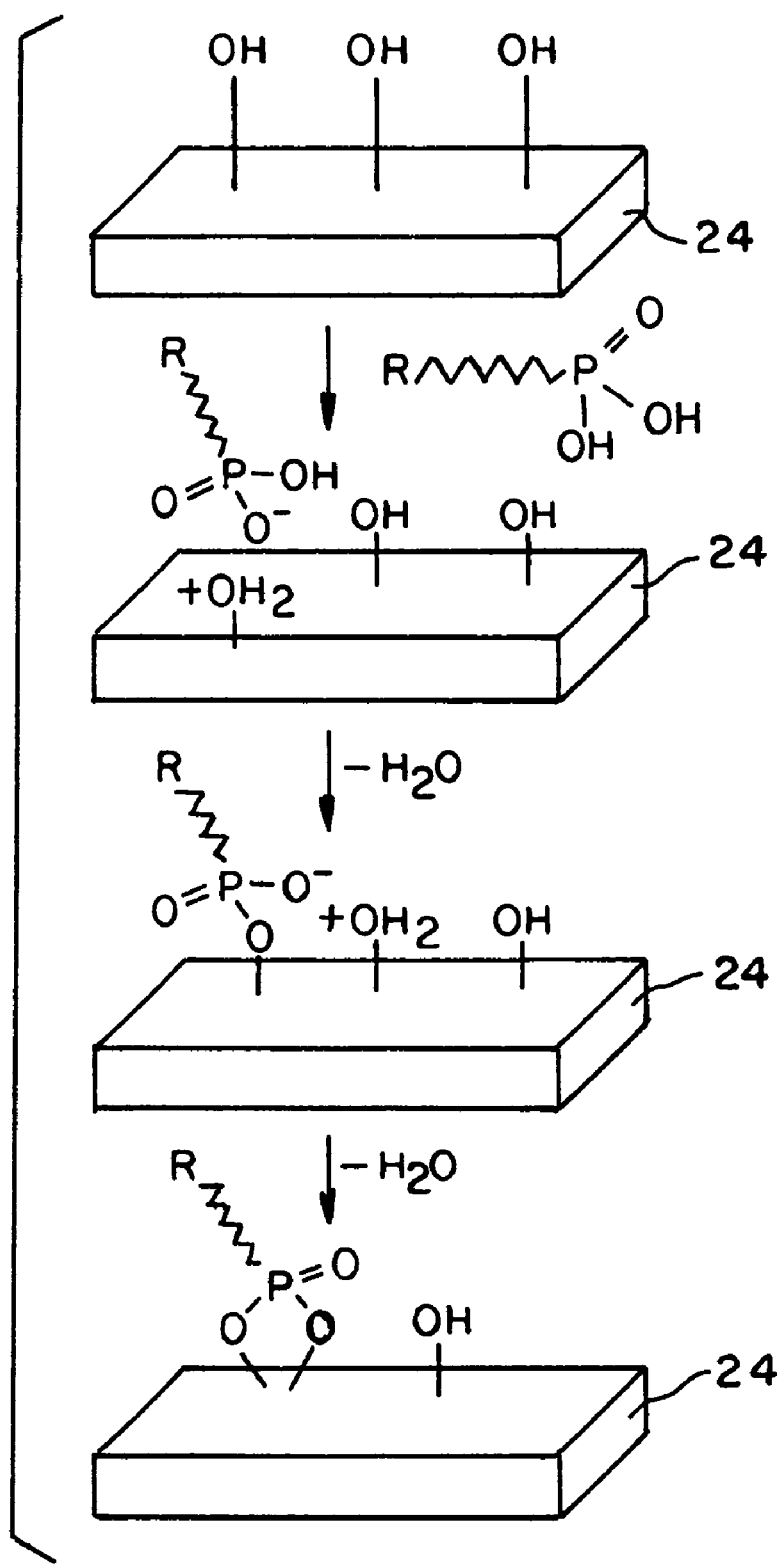
FIG. 2 is a schematic diagram showing a mechanism of thin film formation.

Without wishing to be bound by theory, it is believed that treatment of the applied layer of an organophosphorous acid causes a dehydration reaction that forms a bond between the organic components of the applied acid and substrate 24. Referring to FIG. 2, which shows application of an aliphatic phosphonic acid to a surface including hydroxyl groups, application of the acid results in proton transfer from the acid to the surface. Next, water is eliminated, and the phosphonate is bonded to the surface via a first phosphorus-oxygen bond. Another proton is transferred from the acid to the surface, water is eliminated, and the phosphonate is further bonded to the surface via a second phosphorus-oxygen bond.

The treated film is well adhered to the substrate and, as described above, is capable of altering the surface chemistry of the substrate. The thin film is resistant to mechanical removal (e.g., the film does not delaminate after 100 wipes with a cellulose tissue paper (e.g., a Kimwipe), or solvent rinsing (e.g., sonication and/or heating in ethanol, tetrahydrofuran, or acetonitrile). As another indication of the properties of the treated film, an ink mark (e.g., from a Sharpie marker) can be applied to the film, and the ink mark can be wiped with a Kimwipe or similar cloth or tissue to remove the mark. For very hydrophobic surfaces, the mark can be removed with a few low force wipes. For hydrophilic surfaces, the mark can be difficult to remove, even with many wipes and using high forces. Another test to determine the adhesion of the thin film is a tape test in which a piece of Scotch tape is pressed onto the film, and the tape is removed. The steps of pressing and removing the tape can be repeated a few time, and any changes in the water contact angle can be observed. No changes in the water contact angle may suggest that the thin film is well bonded to the substrate.

In some embodiments, a hydrophobic thin film has a high water contact angle, such as from about 75 degrees to about 130 degrees. The contact angle can be greater than or equal to about 75°, about 80°, about 90°, about 100°, about 110°, or about 120°, and/or less than or equal to about 130°, about 120°, about 110°, about 100°, about 90°, or about 80°. The contact angle is determined using a contact angle goniometer, such as a TANTEC Contact Angle Meter, Model: CAM-Micro.

While a number of embodiments have been described, the invention is not so limited. For example, in other embodiments, multiple applications of solution 22 and subsequent bonding treatments can be performed to form a desired thin film.

The methods and materials described herein can be applied to a number of structures and devices, as discussed above. As one example, certain inkjet cartridges are packaged with a piece of tape adhered to a portion of the cartridge. The tape, which is removed prior to using the cartridge, blocks one or more openings or nozzles on the cartridges through which ink is delivered, for example, to prevent dust or other contamination from entering the cartridge. The surface of the cartridge defining the nozzles may include a polymer derived from an epoxy resin, such as SU-8. In some cases, removing the tape may damage the nozzle because the tape is too strongly adhered to the cartridge. By forming a thin film as described herein on the cartridge (e.g., by applying octadecylphosphonic acid to the polymer surface), the adherence of the tape to the cartridge can be reduced. As a result, the tape can be removed without damaging the nozzles.

The following example is illustrative and not intended to be limiting.

EXAMPLE

A one millimolar solution of octadecylphosphonic acid (in a solvent of ethanol, methanol, or isopropyl alcohol) is sprayed on the surface of the SU-8 substrate. The solvent is allowed to evaporate from the surface and the mask is removed. A standard household iron at ~150° C. is held in contact with the treated surface for about 30 seconds.

The substrate is cooled. The entire surface is then cleaned with ethanol and a tissue.

Other embodiments are within the claims.

What is claimed is:

1. A structure comprising:
   a) an organic substrate, and
   b) a film of an organophosphorous acid bonded to the substrate, the structure being characterized such that the film of the organophosphorous compound is directly bonded to the organic substrate by functional groups of the substrate selected from hydroxyl, oxo, amine and amide, which have formed a covalent chemical bond with the organophosphorous acid and the organo groups associated with the organophosphorous compound are exposed to the atmosphere.

2. The structure of claim 1 wherein the film is a monolayer.

3. The structure of claim 1 in which the organophosphorous compound is chemically bonded to the substrate through a dehydration reaction.

4. The structure of claim 1 wherein the organo group of the organophosphorous compound is selected from an aliphatic, an olefinic and an aryl group.

5. The structure of claim 1 wherein the substrate comprises oxygen.

6. The structure of claim 1 wherein the substrate is a polymeric material.

7. The structure of claim 6 wherein the substrate is in film form.

8. The structure of claim 1 wherein the substrate comprises groups selected from hydroxyl groups and oxo groups.

9. The structure of claim 1 wherein the substrate comprises a nitrogen-hydrogen bond.

10. The structure of claim 1 wherein the substrate comprises an amine or an amide group.

11. The structure of claim 1 wherein the substrate is a polymer selected from a polycarbonate and an epoxy resin and a resin derived from an epoxy resin.

12. The structure of claim 1 wherein the organo group of the organophosphorous acid is selected from an aliphatic group and an olefinic group.

13. The structure of claim 1 wherein the organo group of the organophosphorous acid is selected from aryl-substituted groups.

14. The structure of claim 1 wherein the exposed surface of the structure has a contact angle equal to or greater than 75°.

15. The structure of claim 1 being an ink cartridge.

16. The structure of claim 15 in which the ink cartridge comprises an epoxy resin or a resin derived from an epoxy resin.

17. The structure of claim 16 in which the polymer is cured by ultraviolet radiation.

18. The structure of claim 15 comprising an adhesive tape applied to a portion of the substrate.

19. The structure of claim 1 in which the organophosphorous acid is selected from a phosphoric acid, phosphonic acid and a phosphinic acid including derivatives thereof.

20. The structure of claim 19 in which the organophosphoric acid comprises a compound or a mixture of compounds of the structure:

$$(RO)_x\text{—}P(O)\text{—}(OR')_y$$

where x is 1-2, y is 1-2 and x+y=3; R is a radical having a total of 1-30 carbons; where R' is H, a metal or lower alkyl having 1-4 carbons; and at least a portion of R' is H.

21. The structure of claim 19 in which the organophosphonic acid comprises a compound or a mixture of compounds of the structure:

$$(RO)_x\text{—}\overset{\displaystyle(R'')_y}{\underset{\displaystyle |}{P(O)}}\text{—}(OR')_z$$

wherein x is 0-1, y is 1, z is 1-2 and x+y+z is 3; R and R'' are each independently a hydrocarbon or substituted hydrocarbon radical having a total of 1 to 30 carbons; R' is H, a metal or lower alkyl.

22. The structure of claim 19 in which the organophosphonic acid comprises a compound or mixture of compounds of the structure:

$$(R'')_x\text{—}\overset{\displaystyle(R'')_y}{\underset{\displaystyle |}{P(O)}}\text{—}(OR')_z$$

wherein x is 0-2, y is 0-2, z is 1 and x+y+z is 3; R and R'' are each independently a hydrocarbon or substituted hydrocarbon radicals having a total of 1 to 30 carbons; R' is H, a metal or lower alkyl.

23. The structure of claim 19 in which the organo group of the organophosphorous acid contains a $C_6$ to $C_{18}$ hydrocarbon or substituted hydrocarbon group.

24. The structure of claim 19 in which the organo group of the organophosphorous acid is a halogen-substituted hydrocarbon group.

25. The structure of claim 24 in which the organo group is a perfluoroalkyl group.

26. The structure of claim 23 in which the hydrocarbon or substituted hydrocarbon group is selected from dodecyl and perfluorododecyl.

* * * * *